(Model.)
H. CUTLER.
GRAIN DRYING AND COOLING SHELF.
No. 277,686. Patented May 15, 1883.
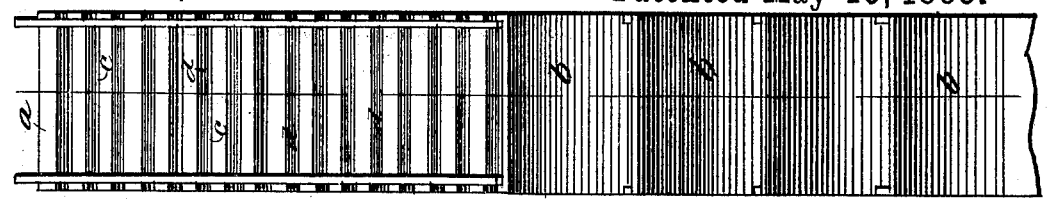
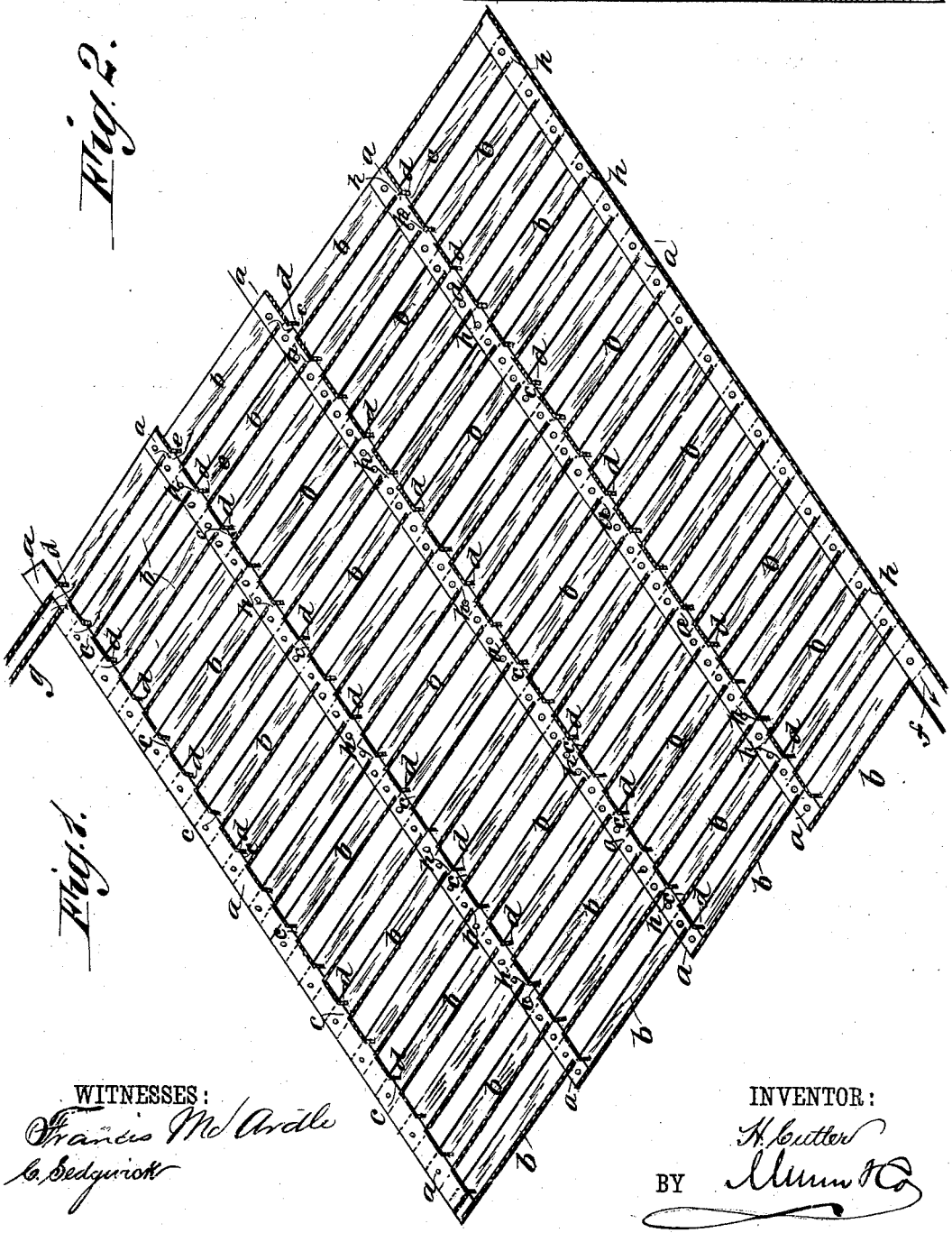
WITNESSES:
INVENTOR:
ATTORNEYS.

UNITED STATES PATENT OFFICE.

HENRY CUTLER, OF NORTH WILBRAHAM, MASSACHUSETTS.

GRAIN DRYING AND COOLING SHELF.

SPECIFICATION forming part of Letters Patent No. 277,686, dated May 15, 1883.

Application filed February 6, 1883. (Model.)

*To all whom it may concern:*

Be it known that I, HENRY CUTLER, of North Wilbraham, in the county of Hampden and State of Massachusetts, have invented new and Improved Grain Drying and Cooling Shelves, of which the following is a full, clear, and exact description.

This invention consists of a system of inclined shelves for spreading grain to be cooled or dried over large areas of surface and returning it again to a delivery-spout by the action of gravity, the grain being all the time moving slowly over the shelves, whereon it is made to change its direction frequently, and is retarded by the shelves and by intercepting counter-currents, so as to effectually limit the velocity of the movements to secure the exposure of the grain on the shelves sufficiently for effective action. The object is to provide simple and efficient means for cooling grain kept in stores and in vessels and otherwise exposed to heating by fermentation, without spreading it out on floors in the common way and turning it over and changing it by hand, and also to so contrive the apparatus that the space occupied when so spread out will not be largely in excess of the bins it occupies in store. It is also designed to provide efficient means for handling the grain in drying-kilns where heat is applied for expelling the moisture, all as hereinafter fully described.

Reference is to be had to the accompanying drawings, forming part of this specification, in which similar letters of reference indicate corresponding parts in both the figures.

Figure 1 is a sectional elevation of my improved system of cooling and drying shelves, taken on line *x x* of Fig. 2. Fig. 2 is a front elevation.

I make two series of inclined shelves, *a* and *b*, both being on the same angle, which I find in practice should be about thirty-four degrees, but in opposite directions and intersecting each other, the shelves *a* being equal in length to the transverse dimensions of the whole series of shelves *b*, but being placed as far apart as the length of the shelves *b*, and being connected together by them. The shelves *b* are located as close together as is consistent with the proper circulation of the air between them for cooling and drying the grain, and where they connect at their upper ends with shelves *a* the latter have openings *c* through the bottom for the passage of the grain through them onto shelves *b*. Above said openings *c* portions *d* of the bottoms of shelves *a* are pitched at a sharper angle than the other portions, to insure the flow of the grain through said openings *c* onto shelves *b*. The shelves *b* connect at their lower ends with shelves *a*, a little above the openings *c*, and terminate short of the bottoms, forming openings *h* to allow the grain to pass along shelves *a*, and thus insure change in the direction of the currents thereat for graduating the flow and effecting exposure of the grain to the air, and intersecting with the currents below. The lower shelf of the series *a* has no openings in the bottom, its function being to receive the grain from shelves *b* and deliver it to the discharge-spout *f*, from which it is to pass into the conveyer or elevators for being returned to the storage-bins.

It will be seen that the grain being delivered from a spout, *g*, onto the upper end of the upper shelf *a* will be distributed by it to all the shelves *b* connecting it with the next of its series, to which it will flow through shelves *b*, and then will descend along shelves *a*, making counter-currents whose direction is changed so as to obstruct the flow along the shelves *b*, and thus effectually secure the desired slow movement of the grain, causing it to spread out on the shelves and occupy them for such length of time as may be necessary for the effectual treatment of the grain.

It will also be seen that the working of this apparatus requires only the delivery of the grain to it through a spout, and the removal of it from another spout, the action of the grain in the apparatus being wholly by the effect of gravity; and, further, it will be seen that the space occupied by the apparatus will not be largely in excess of the bin capacity required for the grain—say about seventy-five per cent.— whereas the floor-space required for spreading it out in the common way demands an area not usually available in grain-stores nor elsewhere.

For use in drying-kilns the shelves should be made of sheet metal, and they may be perforated, if desired, for the better circulation of heat. The wooden shelves for cooling may also be perforated.

Having thus fully described my invention, I claim as new and desire to secure by Letters Patent—

An improved grain drying and cooling apparatus, consisting of a series of inclined parallel shelves, $a$, all except the last of the series having openings communicating with the upper ends of a series of parallel shelves, $b$, inclined downward in an opposite direction at a similar angle to the series $a$, and all except the lowest series terminating above openings in the series of shelves $a$, whereby grain entering said drier at the upper end of the first shelf of the series $a$ is separated by a portion falling through the first opening therein onto the upper end of the first shelf of the series $b$, and carried down to the next shelf of the series $a$, and discharged against said shelf above an opening therein, through which it falls to one of the series of shelves $b$, the other portion of the grain being carried down the first shelf $a$ and separated by a part falling through each successive opening therein onto the shelf beneath, the entire mass of grain meeting and being discharged from the apparatus at a point diagonally opposite the point of entrance, as set forth.

HENRY CUTLER.

Witnesses:
S. E. BAKER,
J. P. FREESE.